(12) United States Patent
Yonehara

(10) Patent No.: US 6,929,827 B2
(45) Date of Patent: Aug. 16, 2005

(54) METHOD OF PRODUCING COLOR FILTER

(75) Inventor: Hisatomo Yonehara, Sakura (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 166 days.

(21) Appl. No.: 09/960,401

(22) Filed: Sep. 24, 2001

(65) Prior Publication Data

US 2002/0081376 A1 Jun. 27, 2002

(30) Foreign Application Priority Data

Sep. 27, 2000 (JP) ..................... P2000-294108

(51) Int. Cl.$^7$ ............... B05D 5/06; B05D 3/02; B05D 3/06; B41J 2/01; G02B 5/20

(52) U.S. Cl. ............ 427/493; 427/510; 427/511; 427/514; 427/520; 427/164; 427/256; 427/385.5; 347/96; 347/100; 359/885

(58) Field of Search .................. 427/287, 372.2, 427/379, 385.5, 389.7, 487, 508, 510, 511, 514, 519, 520, 553, 162, 163.1, 163.2, 164, 165, 256, 493; 347/1, 95, 96, 100; 359/885; 528/230, 254, 258

(56) References Cited

U.S. PATENT DOCUMENTS

| | | | | |
|---|---|---|---|---|
| 5,055,113 A | * | 10/1991 | Larson et al. ............... 51/298 |
| 5,552,192 A | * | 9/1996 | Kashiwazaki et al. ...... 427/492 |
| 5,821,016 A | * | 10/1998 | Satoh et al. .................... 430/7 |
| 5,821,277 A | * | 10/1998 | Hirayama et al. ............ 522/50 |
| 5,871,872 A | * | 2/1999 | Matijevic et al. ............. 430/7 |
| 6,048,924 A | * | 4/2000 | Obayashi et al. ........... 524/501 |
| 6,084,006 A | * | 7/2000 | Kashiwazaki et al. ...... 523/160 |
| 6,143,450 A | * | 11/2000 | Sobue et al. .................... 430/7 |
| 6,203,604 B1 | * | 3/2001 | Kashiwazaki et al. ..... 106/31.5 |
| 6,224,205 B1 | * | 5/2001 | Akahira et al. ............. 347/107 |
| 6,277,529 B1 | * | 8/2001 | Marumoto et al. ............. 430/7 |
| 6,475,683 B1 | * | 11/2002 | Kashiwazaki .................. 430/7 |
| 6,524,757 B2 | * | 2/2003 | Koike et al. .................... 430/7 |
| 2002/0128351 A1 | * | 9/2002 | Kiguchi et al. ............. 523/161 |

FOREIGN PATENT DOCUMENTS

| | | |
|---|---|---|
| EP | 0 825 239 A2 | 2/1998 |
| EP | 1 048 700 A1 | 11/2000 |
| JP | 61-245106 | 10/1986 |
| JP | 63-48369 | 3/1988 |
| JP | 63-294503 | 12/1988 |
| JP | 05-224007 | 9/1993 |
| JP | 07-188596 | 7/1995 |
| JP | 08-171010 | 7/1996 |
| JP | 08-176249 | 7/1996 |
| JP | 08-319444 | 12/1996 |
| JP | 09-143169 | 6/1997 |
| JP | 9-203806 | 8/1997 |
| JP | 09-208821 | 8/1997 |
| JP | 10-017813 | 1/1998 |
| JP | 10-096810 | 4/1998 |
| JP | 10-140015 | 5/1998 |
| WO | WO99/07800 | 2/1999 |

* cited by examiner

Primary Examiner—Timothy Meeks
Assistant Examiner—Wesley D. Markham
(74) Attorney, Agent, or Firm—Armstrong, Kratz, Quintos, Hanson & Brooks, LLP

(57) ABSTRACT

The present invention provides a method of producing a color filter which has pixels formed by an ink-jet printing method and also has superior heat resistance and solvent resistance, especially heat resistance. This method comprises forming pixels on a transparent substrate using a colored composition containing (a) an amino resin having a carboxyl group and/or a phenolic hydroxyl group and (b) a coloring material by an ink-jet printing method, followed by curing the pixels.

17 Claims, No Drawings

METHOD OF PRODUCING COLOR FILTER

BACKGROUND OF THE INVENTION

1. Field of the Invention

The present invention relates to a method of producing a color filter which is used in color liquid crystal displays, color scanners, and solid image pick-up elements and, more particularly, to a method of producing a color filter having excellent durability, suited for use which requires the durability after passing through the step of forming a pattern by means of an ink-jet printing method.

2. Description of Related Art

Examples of radiation-polymerizable colored compositions using coloring materials such as pigments and dyes known to date are (i) photo-curable colored compositions obtained by adding a photopolymerizable monomer and a photopolymerization initiator to a colored composition in which a coloring material is dispersed or dissolved in a binder resin solution and (ii) thermosetting colored compositions obtained by dispersing or dissolving a coloring material in a thermosetting resin. There has also been known a method of forming a colored image by a method of coating the colored composition on a substrate using an ink-jet printing method to form colored patterns and exposing the coated substrate to light or heat energy, thereby to fix the colored patterns. Examples of industrial application of these radiation-polymerizable colored compositions include color filters used in color liquid crystal displays, color scanners, and solid image pick-up elements.

The color filter is formed by arranging coloring materials on each pixel to selectively transmit three primary colors of light (e.g. red, green, and blue) or to selectively reflect three primary colors (e.g. cyan, magenta, and yellow), on a transparent substrate provided with a black matrix.

As the method of forming the color filter, a photolithography method, an electrodeposition method, a printing method, and an ink-jet printing method are known and the photolithography method is mainly used at present. This method is a method comprising many steps, wherein the three steps of applying a photopolymerizable colored composition to a substrate, exposing the substrate to radiation energy through a pattern-mask, and dissolving the non-required portion, and washing are repeated for each red, green, and blue pixels or each cyan, magenta, and yellow pixels, thereby to form a color filter. On the other hand, the ink-jet printing method, which can form red, green, and blue or cyan, magenta, and yellow pixels in one step, has received much attention because of its low cost due to the small number of steps.

Although methods of forming a color filter by the ink-jet printing method are disclosed in Japanese Unexamined Patent Application, First Publication No. Sho 59-75205, Japanese Unexamined Patent Application, First Publication No. Sho 61-245106, and Japanese Unexamined Patent Application, First Publication No. Sho 63-2945 03, the color filters obtained by these methods are inferior in heat resistance and solvent resistance because the coloring material consists of a dye. On the other hand, various methods using a resin and a pigment have been proposed as the method of producing a colored layer having excellent heat resistance and solvent resistance. For example, Japanese Unexamined Patent Application, First Publication No. Hei 5-224007 discloses a color filter using ink-jet printing ink comprising a melamine resin and a colorant; Japanese Unexamined Patent Application, First Publication No. Hei 8-171010 discloses a color filter using thermosetting or photocurable ink-jet printing ink containing an acrylamide polymer; Japanese Unexamined Patent Application, First Publication No. Hei 10-17813 discloses a color filter using ink-jet printing ink consisting mainly of a melamine resin, a polycarboxylic acid derivative, and an amine stabilizer; and Japanese Unexamined Patent Application, First Publication No. Hei 7-188596 discloses ink for thermosetting ink-jet recording using a thermosetting resin and a specific amine as a dispersant.

With the recent increase in the size of liquid crystal displays (abbreviated as LCDs), several requirements have arisen for the materials for color filters in the process of manufacturing color LCDs, and examples thereof include heat resistance which is required in the deposition or sputtering processes of a transparent electrode such as ITO and baking process of a color filter, and solvent resistance, which is required in the cleaning process and coating process for LC alignment film. Another requirement is light resistance since the image information is formed by light which is transmitted through the color filter during displaying the image.

Ink-jet printing ink containing an acrylic resin has had the drawback that the resin is liable to decompose when the temperature exceeds 200° C. Although Japanese Unexamined Patent Application, First Publication No. Hei 5-224007 discloses ink-jet printing ink using a thermosetting resin such as a melamine resin for the purpose of improving the heat resistance, this method has the following drawbacks. Since an organic or inorganic acid or an amine or ammonium salt thereof is used in combination with a curing accelerator in the ink used in the method, these compounds remain as impurities in the film, thereby contaminating the sputtering apparatus upon formation of ITO transparent electrodes or such an ink has a short pot life when it is made as an ink in one package type.

In the production of the color filter using the ink-jet printing method, a method using aqueous ink is disclosed in view of environmental issues. Japanese Unexamined Patent Application, First Publication No. Hei 8-319444 discloses a coating composition for a black matrix containing aqueous ink consisting of pigments. Also Japanese Unexamined Patent Application, First Publication No. Hei 10-96810 discloses a method of forming a color filter using hydrophilic ink after exposing a polysilane photosensitive layer to ultraviolet rays to form a hydrophilic latent image.

It has been required to develop a color filter which has excellent heat resistance and does not undergo color changes due to heat, resulting from the increase of the temperature during the deposition of transparent electrodes by vacuum deposition or sputtering process or baking process. In view of the above, it is required to develop a color filter having pixels which is superior in heat resistance and solvent resistance.

BRIEF SUMMARY OF THE INVENTION

An object of the present invention is to provide a method of producing a color filter, which has pixels formed by an ink-jet printing method and also has excellent heat resistance and solvent resistance, especially heat resistance.

To attain the object described above, the present invention provides a method of producing a color filter, which comprises forming pixels on a transparent substrate using a colored composition containing (a) an amino resin having a carboxyl group and/or a phenolic hydroxyl group and (b) a coloring material by an ink-jet printing method, followed by curing the pixels.

According to the method of the present invention, it is possible to provide a color filter having pixels which has excellent heat resistance and solvent resistance, especially heat resistance. According to the method of producing the color filter of the present invention, it is possible to provide a color filter which has excellent photopolymerizability and is suited to practical use, when the colored composition to be used is incorporated with a compound having a photopolymerizable functional group.

DETAILED DESCRIPTION OF THE INVENTION

The present invention will now be described in more detail.

The amino resin having a carboxyl group and/or a phenolic hydroxyl group used in the present invention (hereinafter referred to as the amino resin (a) used in the present invention) can be prepared by, for example, (1) a method of condensing an amino compound having a carboxyl group and/or a phenolic hydroxyl group with an aldehyde compound, or (2) a method of condensing an aldehyde compund having a carboxyl group and/or a phenolic hydroxyl group with an amino compound.

Examples of the amino compound having a carboxyl group include 2-, 3- or 4-(4,6-diamino-1,3,5-triazin-2-yl) benzoic acid, 5-methyl-2-(4,6-diamino-1,3,5-triazin-2-yl) benzoic acid, 4-methoxy-2-(4,6-diamino-1,3,5-triazin-2-yl) benzoic acid, 2-methyl-4-(4,6-diamino-1,3,5-triazin-2-yl) benzoic acid, and 2-chloro-4-(4,6-diamino-1,3,5-triazin-2-yl)benzoic acid. Examples of the amino compound having a phenolic hydroxyl group include 2-, 3- or 4-(4,6-diamino-1,3,5-triazin-2-yl)-phenol, 4-methyl-2-(4,6-diamino-1,3,5-triazin-2-yl)-phenol, 2-methoxy-4-(4,6-diamino-1,3,5-triazin-2-yl)-phenol, and 3-chloro-4-(4,6-diamino-1,3,5-triazin-2-yl)-phenol.

Examples of the aldehyde compound having a carboxyl group include glyoxylic acid and its hydrate, and succinsemialdehyde.

Examples of the aldehyde compound having a phenolic hydroxyl group include 2-, 3- or 4-hydroxybenzaldehyde, 3,4-, 3,5- 2,5- or 2,4-hydroxybenzaldehyde, and 2,4,6-hydroxybenzaldehyde.

Examples of the aldehyde compound include formaldehyde, paraformaldehyde, acetaldehyde, propionaldehyde, butylaldehyde, glyoxazol; formaldehyde condensates such as trioxane or paraformaldehyde; aqueous solutions such as an aqueous formaldehyde solution; and methylhemiformal, n-butylhemiformal or isobutylhemiformal, in addition to the above aldehyde compounds having a carboxyl group and/or phenolic hydroxyl group.

Examples of the amino compound include urea, melamine, benzoguanamine, acetoguanamine, cyclohexanecarboguanamine, phthaloguanamine, steroguanamine, and spiroguanamine, in addition to the above amino compounds having a carboxyl group and/or phenolic hydroxyl group.

In case of preparing the amino resin (a) used in the present invention by the method (1) or (2) described above, more than one kind of amino compounds and/or more than one kind of aldehyde compounds can be used. For example, benzoguanaine and 4-(4,6-diamino-1,3,5-trizin-2-yl) benzoic acid can be used in combination in a desired proportion and, furthermore, formaldehyde and glyoxylic acid can be used in combination in a desired proportion. An acid value of the resulting amino resin can be adjusted by using plural kinds of amino compounds and/or aldehyde compounds as the raw material, thereby making it control the developing properties of the curable colored composition.

The amino resin (a) obtained by the above method can be stabilized by etherifying the methylol groups, formed by the condensation, with an alcohol.

The amino resin (a) used in the present invention can be prepared by the method of reacting 1.0 mol of the amino compound, 1.5 to 8 mol of the aldehyde compound, and 3 to 20 mol of the alcohol for etherification in the presence of a conventionally known solvent, if necessary, according to the method described in Japanese Unexamined Patent Application, First Publication No. Hei 9-143169, Japanese Unexamined Patent Application, First Publication No. Hei 8-176249, Japanese Unexamined Patent Application, First Publication No. Hei 9-208821 or Japanese Unexamined Patent Application, First Publication No. Hei 10-140015.

When using two or more amino compounds and/or aldehyde compounds in combination, the proportion is not specifically limited. When the acid value of the resulting amino resin (a) is too small, the solubility in a water-soluble solvent is poor and the curing action due to the carboxyl group or phenolic hydroxyl group on thermosetting tends to be lowered. On the other hand, when the acid value of the resulting amino resin (a) is too large, the water resistance after curing tends to become poor. Accordingly, the composition is preferably adjusted so that the acid value of the amino resin (a) is within a range from 20 to 250 mg KOH/g.

The amino resin (a) having etherified methylol groups can be prepared by conventionally known methods. Examples thereof include:

(1) a method of adding an amino compound to a solution prepared by adding an aldehyde compound to an alcohol for etherification, and reacting the mixed solution at a temperature of 50 to 140° C. for 20 minutes to 7 hours, if necessary, in the presence of an acidic catalyst, thereby simultaneously carrying out the condensation reaction and etherification reaction, (2) a method of methylolating a solution containing an aldehyde compound and an amino compound at a pH within a range from 8 to 10, and carrying out the alkyl etherification reaction at a pH within a range from 2 to 6 in the presence of an alcohol for etherification, (3) a method of adding at least one amino compound selected from the group consisting of urea, melamine, benzoguanamine, acetoguanamine, cyclohexanecarboguanamine, phthaloguanamine, steroguanamine, and spiroguanamine to a solution prepared by adding an aldehyde compound to an alcohol for etherification, and adding (4,6-diamino-1,3,5-triazin-2-yl) benzoic acid and/or (4,6-diamino-1,3,5-triazin-2-yl)-phenol during the condensation reaction and etherification reaction, and (4) a method of adding at least one aldehyde compound selected from the group consisting of formaldehyde, paraformaldehyde, acetaldehyde, propionaldehyde, butylaldehyde, glyoxazol, glyoxylic acid, succinsemialdehyde, and 2-, 3- or 4-hydroxybenzaldehyde to an alcohol for etherification, and adding at least one amino compound selected from the group consisting of urea, melamine, benzoguanamine, acetoguanamine, cyclohexanecarboguanamine, phthaloguanamine, steroguanamine, spiroguanamine, (4,6-diamino-1,3,5-triazin-2-yl)benzoic acid, and (4,6-diamino-1,3,5-triazin-2-yl)-phenol, thereby carrying out the condensation reaction and etherification reaction.

It is also possible to dissolve or disperse in water or a mixture of water and a water-soluble solvent by completely or partially neutralizing the carboxyl group and/or phenolic hydroxyl group introduced into the amino resin (a) with various volatile bases such as ammonia and organic amine.

Examples of the organic amine used to neutralize the carboxyl group and/or the phenolic hydroxyl group introduced into the amino resin (a) include, but are not limited to, alkylamines such as monomethylamine, dimethylamine, monoethylamine, diethylamine, and triethylamine; hydroxylamines such as N-methylaminoethanol, N,N-dimethylaminoethanol, N,N-diethylaminoethanol, 2-amino-2-methylpropanol, diethanolamine, and triethanolamine; and polyvalent amines such as ethylenediamine and diethylenetriamine. These organic amines may be used alone or in combination.

As the coloring material used in the present invention, for example, dyes and pigments used usually as the color filter can be used without any trouble, but pigments are preferably used in view of their heat resistance and light resistance.

The average particle diameter of the pigment is preferably within a range from 0.005 to 3 μm, and more preferably from 0.01 to 1 μm. When the average particle diameter is smaller than the above range, thixotropy may occur and, therefore, good applicability cannot be obtained. On the other hand, when the average particle diameter is larger than the above range, the resulting coating layer has poor transparency. To obtain the average particle diameter within the above range, a dispersion treatment using a ball mill, sand mill, bead mill, three-roll mill, paint shaker, attriter, dispersion stirrer, and ultrasonic wave is effective.

A colored composition containing a coloring material dispersed therein is usually prepared by using the above coloring material and amino resin (a) as well as a solvent. Examples of the solvent used in the preparation of the colored composition include aromatic solvents such as toluene, xylene, or methoxybenzene; acetic acid ester solvents such as ethyl acetate, butyl acetate, propylene glycol monomethyl ether acetate, or propylene glycol monoethyl ether acetate; propionate solvents such as ethoxyethyl propionate; alcohol solvents such as methanol, ethanol, propanol, or ethyleneglycol; ether solvents such as butylcellosolve, propylene glycol monmethyl ether, diethylene glycol diethyl ether, or diethylene glycol dimethyl ether; ketone solvents such as methyl ethyl ketone, methyl isobutyl ketone, or cyclohexanone; aliphatic hydrocarbon solvents such as hexane; nitrogen compound solvents such as N,N-dimethylformamide, γ-butyrolactam, N-methyl-2-pyrrolidone, aniline, or pyridine; lactone solvents such as γ-butyrolactone; carbamic acid esters such as a mixture of methyl carbamate and ethyl carbamate in a mixing ratio of 48:52; and water. Among these solvents, those having a boiling point of 80 to 200° C. are preferred. These solvents may be used alone or in combination.

Since the amino resin (a) used in the present invention is hydrophilic, the solvent used in the colored composition may be water or a solvent consisting mainly of water.

In the preparation of the colored composition containing the coloring material dispersed therein, a dispersant can be used in combination. The dispersant is not specifically limited and a conventionally known dispersant can be used. Specific examples thereof include surfactants, intermediates of pigments, intermediates of dyes, and resin type dispersants such as polyester compounds, polyamide compounds, and polyurethane compounds.

Examples of commercially available products of this resin type dispersant include "DISPERBYK 130", "DISPERBYK 161", "DISPERBYK 162", "DISPERBYK 163", and "DISPERBYK 170" (manufactured by Byk Chemie Japan); "EFKA 46" and "EFKA 47" (manufactured by EFKA CHEMICALS); "SOLSPERSE 32550" and "SOLSPERSE 24000" (manufactured by Zeneca Co., Ltd.); and "AJISPER PB811" and "AJISPER PB814" (manufactured by AJINOMOTO CO., INC.). Acrylic and polyethyelene resin type dispersants can also be used.

The amount of the coloring material is preferably within a range from 10 to 70% by weight based on the non-volatile content in the colored composition. When using the dispersant with the coloring material, the amount of the dispersant is preferably within a range from 5 to 50% by weight based on the coloring material.

The color filter can be produced by the method of forming pixels on a transparent substrate using the colored composition used in the present invention by an ink-jet recording method, followed by thermally curing the pixels. In that case, the amino resin (a) itself is thermosetting. There is the advantage that it is not required to use a curing accelerator in combination because the amino resin (a) used in the present invention has a carboxyl group or a phenolic hydroxyl group, and the resulting color filter is free from impurities which originate from the curing accelerator remaining after curing.

The colored composition used in the present invention can contain a compound having a photopolymerizable functional group. In this case, the color filter can also be produced by forming pixels on a transparent substrate by the ink-jet recording method, followed by photopolymerizing and thermally curing the pixel. In that case, a photopolymerization initiator is preferably used in the colored composition. An energy ray used for photopolymerization is preferably in the wavelength range of 200 to 500 nm.

The compound having a photopolymerizable functional group used in the present invention is a compound having a functional group capable of polymerizing or crosslinking by means of irradiation with ultraviolet rays or visible rays, and typical examples thereof include radically polymerizable compounds and cationically polymerizable compounds. Specific examples thereof include (meth)acrylic compounds and maleimide compounds.

Examples of the (meth)acrylic compound used as the compound having a photopolymerizable functional group include trimethylolethane tri(meth)acrylate, timethylolpropane tri(meth)acrylate, timethylolpropane di(meth)acrylate, neopentyl glycol di(meth)acrylate, pentaerythritol tetra (meth)acrylate, pentaerythritol tri(meth)acrylate, dipentaerythritol hexa(meth)acrylate, dipentaerythritol penta (meth)acrylate, hexanediol di(meth)acrylate, trimethylolpropane tri(acryloyloxypropyl) ether, tri (acryloyloxyethyl) isocyanurate, tri(acryloyloxyethyl) cyanurate, and glycerin tri(meth)acrylate; reaction products of (meth)acrylic acid and epoxy resin, such as phenol-novolac type epoxy resin, cresol.novolac type epoxy resin, and bisphenol A type epoxy resin; and reaction products of polyols (e.g. ethylene glycol, polyethylene glycol, polypropylene glycol, polytetramethylene glycol, polyethoxydiol of bisphenol A, polyesterpolyol, polybutadienediol, polycarbonate polyol, etc.), organic polyisocyanates (e.g. tolylene diisocyanate, xylylene diisocyanate, isophorone diisocyanate, hexamethylene diisocyanate, etc.), and hydroxyl group containing (meth)acrylates (e.g. 2-hydroxyethyl (meth)acrylate, 2-hydroxypropyl (meth) acrylate, 1,4-butanediol mono(meth)acrylate, etc.).

The maleimide compound used as the compound having a photopolymerizable functional group is preferably a compound wherein a maledimide group is bonded to an aliphatic group, for example, alkyl or alkyl ether maleimide, and specific examples thereof include N-hexyl maleimide or N,N'-4,9-dioxa-1,12-bismaleimidedecane, maleimidecarboxylic acid (poly)alkylene glycol ester such as ethylene glycol bis(maleimide acetate), poly(tetramethylene glycol) bis(maleimide acetate) or tetra(ethylene glycol modified) pentaerythritol tetra(maleimide acetate), carbonate maleimide such as bis(2-maleimideethyl) carbonate, and urethane maleimide such as isophoronebisurethanebis(N-ethylmaleimide).

Among these compounds, polyfunctional (meth)acrylates and polyfunctional maleimides, such as trimethylolpropane tri(meth)acrylate, pentaerythritol tetra(meth)acrylate, dipentaerythritol hexa(meth)acrylate, dipentaerythritol penta (meth)acrylate, N,N'-4,9-dioxa-1,12-bismaleimidedecane, ethylene glycol bis(maleimdie acetate), poly(tetramethylene glycol) bis(maleimide acetate), (ethylene glycol modified) pentaerythritol tetra(maleimide acetate), bis(2-maleimideethyl) carbonate, and isophoronebisurethanebis (N-ethylmaleimide) are particularly preferred in view of curing under irradiation with ultraviolet rays or visible rays.

The compounds having a photopolymerizable functional group may be used alone or in combination and the amount is not specifically limited, but is preferred from 25 to 150% by weight based on the total amount of the binder resins containing an amino resin (a) used in the photopolymerizable colored composition. When the amount exceeds 150% by weight, the heat resistance of the present invention is less than desired. On the other hand, when the amount is lower than 25% by weight, it becomes difficult to obtain a cured coating layer having the desired physical properties or to form a pattern, then it is not preferred.

If necessary, photopolymerization initiators can also be used in combination with the photopolymerizable colored composition used in the present invention. As the photopolymerization initiator, a photopolymerization initiator capable of generating a radical by dissociation upon irradiation with light can be used. A conventionally known photopolymerization initiator can be used as such a photopolymerization initiator.

Conventionally known photosensitizers can also be used in combination with the photopolymerization initiator. Examples of the photosensitizer used in the present invention include amines, ureas, sulfur containing compounds, phosphorous containing compounds, chlorine containing compounds, nitrites, and other nitrogen containing compounds. These photosensitizers can be used alone or in combination. The amount is not specifically limited, but is preferred within a range from 0.1 to 30% by weight, and particularly preferable from 1 to 20% by weight based on the compound having a photopolmerizable group in the composition. When the amount is smaller than 0.1% by weight, the sensitivity tends to lower. On the other hand, if the amount exceeds 30% by weight, precipitation of crystals and deterioration of the physical properties of the coating occurs and, therefore, it is not preferred.

The viscosity of the energy-ray curable colored composition is preferably adjusted to 50 mPa·s or less, and particularly preferably 10 mPa·s or less, to facilitate ejecting ink from the ink-jet print head. Therefore, the amount of the solvent is preferably within a range from 1 to 19 parts by weight based on 1 part by weight of the whole solid content.

The resulting colored composition used in the present invention is superior in storage stability because it is a one-pack type and, furthermore, the composition can be formed by using an aqueous or non-aqueous solvent because an amino resin having a carboxyl group and/or a phenolic hydroxyl group is used. According to the method of the present invention, since a crosslinked structure is formed by the thermocrosslinking reaction of the amino resin in the baking process after formation of the pixels, the resulting color filter has excellent heat resistance and solvent resistance.

If necessary, the colored composition used in the present invention may contain other components without departing from the object of the present invention, especially as far as the storage stability, heat resistance, and solvent resistance can be maintained. Examples of such other components include conventionally known coupling agents, antioxidants, stabilizers, fillers, various leveling agents (e.g. silicon, fluorine, and acrylic leveling agents), polycarboxylic acids and anhydrides thereof, and epoxy compounds.

A coupling agent, which is optionally added to the colored composition used in the present invention, is a compound which chemically bonds an inorganic material with an organic material, or improves the affinity between them accompanied with the chemical reaction, and thereby enhances the function of the composite material. Typical coupling agents include, for example, silane compounds, titanium compounds or aluminum compounds.

Among these coupling agents, a silane coupling agent having an epoxy group such as γ-glycidoxypropyltrimethoxysilane or β-(3,4-epoxycyclohexyl)ethyltrimethoxysilane is preferred because it imparts remarkably excellent smoothness, adhesion, water resistance, and solvent resistance to various transparent substrates. These coupling agents may be used alone or in combination.

The amount of these coupling agents is within a range from 0.1 to 30 parts by weight, and preferably from 0.5 to 20 parts by weight, based on 100 parts by weight of the amino resin (a). When the amount of the coupling agent is 0.1 parts by weight or less, the smoothness, adhesion to the transparent substrate, water resistance, and solvent resistance of the resulting coating layer are insufficient. On the other hand, when the amount exceeds 30 parts by weight, a further improvement in adhesion cannot be expected and the energy-curability of the resulting coating layer is lowered and, therefore, it is not preferred.

Furthermore, polycarboxylic acids and acid anhyrides thereof are used for the purpose of adjusting the solubility to the aqueous solvent. Epoxy compounds can be used for the purpose of reducing carboxyl groups, remaining in the coating after photocuring, by the thermal reaction.

Examples of the epoxy compound include phenol.novolac type epoxy resin, cresol.novolac type epoxy resin, bisphenol A type epoxy resin, bisphenol F type epoxy resin, bisphenol A.novolac type epoxy resin, alicyclic epoxy resin, various glycols or alkylene oxide-modified epoxy resin, and acrylic resin containing glycidyl group or alicyclic epoxy group. These epoxy compounds can be used alone or in combination.

The color filter of the present invention can be obtained by coating the resultant colored composition used in the present invention to the surface of a transparent substrate by the ink-jet printing method to form a color filter pattern, and then thermosetting the color filter pattern, or photopolymerizing the color filter pattern and subsequently thermosetting.

The transparent substrate used in the present invention is a transparent substrate which is used in the color filter commonly and has enough heat resistance to endure thermosetting. Such a transparent substrate is, for example, a glass substrate.

Examples of the ink-jet printing method used in the present invention include the bubble-jet method using an electric-thermo exchanger as an energy generating element, and a piezo-jet method using a piezo-electric element.

To form a colored pattern, the colored composition used in the present invention is first coated on a transparent substrate provided with a black matrix by ejecting inks through the ink ejecting head according to the ink-jet printing method, thereby to form a predetermined colored pattern. The black matrix can be formed on the transparent substrate by a known method such as a method of forming a metal thin film by a sputtering or vacuum deposition method, followed by patterning with a photolithography method, a method of patterning by a photolithography process using a black colored resin composition, or an ink-jet printing method. According to properties of the colored composition, the black matrix can be subjected to a treatment of hydrophilicity, a treatment of hydrophobicity, or a treatment of oil repellency. It is effective as a means for enhancing adhesion between the substrate and the pixel patterns to subject the substrate to a surface treatment using an auxiliary adhesive such as a coupling agent. The substrate can be provided with an ink-jet ink receiving layer.

For example, the color filter can be formed by the following method. After pixels are formed by ejecting the colored composition for the present invention through the ink ejecting head toward the transparent substrate provided with the black matrix by the ink-jet printing method, the pixels are thermosetted, or thermosetted after photopolymerization. If necessary, a protective film is formed on the pixels and, furthermore, transparent conductive electrodes such as ITO are optionally formed after the after-baking process.

Examples of the heat source used in thermosetting include conventionally known heat sources such as hot plates, electric ovens, and infrared ray heating furnaces. The heating temperature is preferably within a range from 150 to 300° C. When the temperature is lower than 150° C., the film strength, the solvent resistance, and the alkali resistance are poor because of insufficient thermosetting. On the other hand, when the temperature exceeds 300° C., excess volume shrinkage occurs in pixels and thus problems in adhesion to the substrate and accuracy are likely to occur, and this is not preferred.

A light source used for photocuring of the composition is preferably a light source capable of emitting ultraviolet rays or visible rays, and a particularly preferable light source is a light source for emitting light having a wavelength of 200 to 500 nm. From an economic viewpoint, ultraviolet rays are particularly preferred. Examples of a source capable of emitting ultraviolet rays or visible rays include low-pressure mercury lamps, medium-pressure mercury lamps, high-pressure mercury lamps, metal halide lamps, chemical lamps, black light lamps, mercury-xenon lamps, eximer lamps, short arc lamps, helium-cadmium lasers, argon lasers, and THG or FHG lasers using Nd-YAG lasers. The photocuring conditions vary depending on the kind of the light source and the kind and amount of the photopolymerization initiator, therefore, it cannot be specifically defined. However, in viewpoint of the productivity, the dose is preferably within a range from 100 to 3000 J/cm$^2$. When both photopolymerization and thermosetting processes are applying to produce a color filter, the thermosetting conditions described above are applied.

According to the method of the present invention, a color filter can be produced by preparing three kinds of colored compositions containing, as a coloring material, a coloring material capable of selectively transmitting three primary colors (e.g. red, green, and blue) of light or a coloring material capable of selectively reflecting three primary colors (e.g. cyan, magenta, and yellow) of color, forming pixels of three primary colors made of three kinds of colored compositions on a transparent substrate provided with a black matrix, using a publicly known ink-jet printing method, followed by curing the pixels. According to the method of the present invention, a black matrix portion can also be formed, in addition to the above pixels of three primary colors.

EXAMPLES

The present invention will be described in detail by way of the following Examples, but the present invention is not limited by the Examples. In the following Examples, parts and percentages are by weight unless otherwise indicated. Performance tests of the resulting coatings were carried out by the following procedures.

<Performance Test and Evaluation Criteria>
<<Storage Stability>>

The viscosity was measured after a colored composition was stored at 40° C. for 24 hours. Test samples where the change in viscosity relative to the initial viscosity is smaller than 10% were rated "good (○)", while test samples where the change in viscosity relative to an initial viscosity is larger than 10% were rated "poor (×)". The viscosity was measured by using an E type viscometer manufactured by TOKIMEC INC.

<<Curing Conditions>>

Photopolymerization conditions: A pattern was formed by an ink-jet printing method, dried at 110° C. for 10 minutes, and then cured by exposing to light from a medium-pressure mercury lamp at a dose of 1000 J/m$^2$.

Thermosetting conditions: A pattern was formed by an ink-jet printing method, dried at 110° C. for 10 minutes, and then cured in an oven at 200° C. for 30 minutes.

After-baking: After the photopolymerization or the thermosetting, the after-baking was carried out at 230° C. for 15 minutes.

<<Evaluation of Physical Properties of Coating Layer>>

Heat resistance 1:

The coating layer obtained by coating on the glass substrate using an ink-jet printing method and subsequently curing was heated at 280° C. for 30 minutes and the heat resistance 1 was evaluated by the change in transparency (Y value) in the color hue before and after heating. Test samples where the difference ΔY in Y value is smaller than 0.5 were rated "good (○)", while test samples where the difference ΔY in Y value is larger than 0.5 were rated "poor (×)". The chromaticity was measured by a microscopic spectrophotometer OSP-SP200 manufactured by OLYMPUS OPTICAL CO., LTD.

Heat resistance 2:

The coating layer obtained by coating on the glass substrate using an ink-jet printing method and subsequently curing was heated at 280° C. for 30 minutes and the heat resistance 2 was evaluated by the change in maximum light transmittance before and after heating. Test samples where the difference in maximum light transmittance is smaller than 5% were rated "good (○)", while test samples where the difference in maximum light transmittance is larger than 5% were rated "poor (×)".

Solvent resistance 1:

The coating layer obtained by application to a glass substrate using an ink-jet printing method and subsequently curing was dipped in N-methyl-2-pyrrolidone at 23° C. for 30 minutes and the boundary surface of the dipped portion was observed. Test samples where the boundary line could not be visually confirmed were rated "good (○)", while test samples where the boundary line could be visually confirmed were rated "poor (×)".

Solvent resistance 2:

The coating layer obtained by application to a glass substrate using an ink-jet printing method and subsequently curing was rubbed with acetone at 25° C. under a load of 100 g using a rubbing tester [manufactured by Taihei Rika Kogyo Co., Ltd.] and the number of rubs required to expose the glass substrate as a base was determined. Test samples where the number of rubs was less than 25 were rated "poor (×)", test samples where the number of rubs was 25 or more and less than 100 were rated "good (○)", and test samples where the number of rubs was more than 100 were rated "excellent (◎)".

Preparation Example 1

Preparation of Amino Resin Having Carboxyl Group

In a four-necked flask equipped with a thermometer, a reflux condenser, and a stirrer, 131.7 parts of 2-(4,6-diamino-1,3,5-triazin-2-yl)benzoic acid containing 12.3 parts of water, 202.8 parts of an aqueous 37% formaldehyde solution, and 222.3 parts of n-butanol were charged, and then the four-necked flask was dipped in an oil bath preheated to 115° C. with stirring. After 15 minutes, the mixture became a uniform solution and refluxing was initiated. After the reaction was continued for two hours, water and excess formaldehyde were distilled off under a reduced pressure of $5.33 \times 10^4$ Pa over three hours.

After water and n-butanol were distilled off, propylene glycol monomethyl ether acetate (hereinafter abbreviated to PGMAc) was added and the mixture was cooled. PGMAc was further added to adjust the nonvolatile content (% by weight of residual resin after drying at 107.5° C. for one hour) to be 40.0%. As a result, an amino resin (A-1) having a carboxyl group, wherein the acid value (the number of milligrams of potassium hydroxide required to neutralize an acid content in 1 g of a sample according to a defined method) of the resin solid content was 94.6 mg KOH/g was obtained. The number-average molecular weight Mn calculated in terms of polystyrene was 2150 and the molecular weight distribution Mw/Mn was 5.12.

Preparation Example 2

Preparation of Amino Resin Having Carboxyl Group

In a four-necked flask equipped with a thermometer, a reflux condenser, and a stirrer, 37.4 parts benzoguanamine, 118.4 parts of an aqueous 50% glyoxylic acid solution, and 88.8 parts of n-butanol were charged, and then the four-necked flask was dipped in an oil bath preheated to 115° C. with stirring. After 15 minutes, the mixture became a uniform solution and refluxing was initiated. After the reaction was continued for one hour, water was distilled off under a reduced pressure of $5.33 \times 10^4$ Pa over four hours. Subsequently, water and n-butanol were distilled off, PGMAc was added and the mixture was cooled. The PGMAc was further added to adjust the nonvolatile content to be 40.0%. As a result, an amino resin (A-2) having a carboxyl group, wherein the acid value of the resin solid content was 136 mg KOH/g was obtained. The number-average molecular weight Mn calculated in terms of polystyrene was 1624 and the molecular weight distribution Mw/Mn was 1.28.

Preparation Example 3

Preparation of Amino Resin Having Phenolic Hydroxyl Group

In a four-necked flask equipped with a thermometer, a reflux condenser, and a stirrer, 18.7 parts benzoguanamine, 48.8 parts of p-hydroxybenzaldehyde, and 88.8 parts of n-butanol were charged, and then the four-necked flask was dipped in an oil bath preheated to 125° C. with stirring. After 20 minutes, the mixture became a uniform solution and refluxing was initiated. The reaction was continued at the same temperature for 24 hours. After the completion of the reaction, n-butanol was distilled off under a reduced pressure of $5.33 \times 10^4$ Pa and the resulting solid was washed with a mixed solution of n-hexane and ethyl acetate in a mixing ratio of 2:1 to remove excess p-hydroxybenzaldehyde. PGMAc was added and the mixture was cooled. PGMAc was further added to adjust the nonvolatile content to be 40.0%. As a result, an amino resin (A-3) having a phenolic hydroxyl group, wherein the acid value of the resin solid content was 85.2 mg KOH/g was obtained. The number-average molecular weight Mn calculated in terms of polystyrene was 4000 and the molecular weight distribution Mw/Mn was 3.26.

Preparation Example 4

Preparation of Acrylic Resin Having Carboxyl Group

In a four-necked flask equipped with a thermometer, a reflux condenser, a stirrer, and a nitrogen gas introducing inlet, 425.0 parts of PGMAc was charged and, after heating to 90° C. with stirring, a mixture of 42.8 parts of methacrylic acid (hereinafter abbreviated to MAA), 286.1 parts of benzyl methacrylate (hereinafter abbreviated to BzMA), 96.0 parts of PGMAc, and 16.5 parts of t-butylperoxy-2-ethyl hexanoate (hereinafter abbreviated to P-O) was added dropwise over one hour. After the completion of the dropwise addition, the mixture was maintained at 90° C. for two hours and 1.7 parts of "P-O" was added. Furthermore, the reaction was carried out at the same temperature for seven hours to obtain an acrylic resin (A-4) solution having a carboxyl group, wherein the acid value of the resin solid content was 84.0 mg KOH/g. The nonvolatile content of the resulting resin solution was 39.7%, the number-average molecular weight Mn calculated in terms of polystyrene was 9500, and the molecular weight distribution Mw/Mn was 2.07.

Example 1

Using a high-"TSG-6H" speed dispersing machine (manufactured by Igarashi Kikai Seizo) charged with 0.5 mmø zirconia beads, a dispersion consisting of 25.0 parts of an amino resin solution (A-1) having a carboxyl group prepared in Preparation Example 1, 8.0 parts of Pigment Red 254, 2.5 parts of AJISPER PB814 as a dispersant, and 64.5 parts of PGMAc was dispersed at 2000 $m^{-1}$ for eight hours to obtain a red pigment dispersion. Then, 7.0 parts of dipentaerythritol hexaacrylate (hereinafter abbreviated to DPHA) and 0.3 parts of IRGACURE#369 were added to 100 parts of the red pigment dispersion and, after mixing them, the mixture was filtered through a filter having a pore diameter of 1.0 μm to obtain a photopolymerizable colored composition (R-1).

25 g of the resulting photopolymerizable colored composition (R-1) was transferred to a glass container and stored at 40° C. for 24 hours after sealing. The storage stability was evaluated according to the procedures of the performance tests. As a result, the storage stability was found to be good.

Pixel patterns were formed using the photopolymerizable colored composition (R-1) by a piezo ink-jet print head, and then pre-baked at 110° C. for 10 minutes to form red coating patterns. The resulting coating patterns were exposed to light from a medium-pressure mercury lamp at a dose of 1000 J/m$^2$ in accordance with the photopolymerization conditions. The resulting coating patterns were thermosetted at 230° C. for 15 minutes to obtain red pixel patterns for a color filter.

The resulting red pixel patterns for the color filter were evaluated according to items of the performance test. As a result, these pixel patterns were found to have superior heat resistance and superior solvent resistance. The absorption spectra and thin-film X-ray diffractions of the red pixel patterns after the heat resistance test were measured. No changes in crystal form or increases in the crystal size of the red pigment were observed. The evaluation results are summarized in Table 1.

Example 2

A photopolymerizable colored composition (R-2) was obtained in the same manner as in Example 1, except that the amino resin (A-1) used in Example 1 was replaced by an amino resin (A-2) obtained in Preparation Example 2.

25 g of the resulting photopolymerizable colored composition (R-2) was transferred to a glass container and stored at 40° C. for 24 hours after sealing, and the storage stability was evaluated. As a result, the storage stability was found to be good.

Then, pixel patterns were formed on a glass substrate using the photopolymerizable colored composition (R-2) in the same manner as in Example 1. In the same manner as in Example 1, the resulting coating patterns were exposed and thermosetted to obtain red pixel patterns for a color filter.

The resulting red pixel patterns for a color filter were evaluated according to items of the performance test. As a result, these pixel patterns were found to have superior heat resistance and superior solvent resistance. The absorption spectra and thin-film X-ray diffractions of the red pixel patterns after the heat resistance test were measured. No changes in crystal form or increases in the crystal size of the red pigment were observed. The evaluation results are summarized in Table 1.

Example 3

A photopolymerizable colored composition (R-3) was obtained in the same manner as in Example 1, except that the amino resin (A-1) used in Example 1 was replaced by an amino resin (A-3) obtained in Preparation Example 3.

25 g of the resulting photopolymerizable colored composition (R-3) was transferred to a glass container and stored at 40° C. for 24 hours after sealing, and the storage stability was evaluated. As a result, the storage stability was found to be good.

Then, pixel patterns were formed on a glass substrate using the photopolymerizable colored composition (R-3) in the same manner as in Example 1. In the same manner as in Example 1, the resulting coating patterns were exposed and thermosetted to obtain red pixel patterns for a color filter.

The resulting red pixel patterns for a color filter were evaluated according to items of the performance test. As a result, these pixel patterns were found to have superior heat resistance and superior solvent resistance. The absorption spectra and thin-film X-ray diffractions of the red pixel patterns after the heat resistance test were measured. No changes in crystal form or increases in the crystal size of the red pigment were observed. The evaluation results are summarized in Table 1.

Example 4

A photopolymerizable colored composition (R-4) was obtained in the same manner as in Example 1, except that 25 parts of the amino resin (A-1) obtained in Preparation Example 1 used in Example 1 was replaced by a mixture of 12.5 parts of the amino resin (A-1) obtained in Preparation Example 1 and 12.5 parts of the acrylic resin (A-4) obtained in Preparation Example 4.

25 g of the resulting photopolymerizable colored composition (R-4) was transferred to a glass container and stored at 40° C. for 24 hours after sealing, and the storage stability was evaluated. As a result, the storage stability was found to be good.

Then, pixel patterns were formed on a glass substrate using the photopolymerizable colored composition (R-4) in the same manner as in Example 1. In the same manner as in Example 1, the resulting coating patterns were exposed and thermosetted to obtain red pixel patterns for a color filter.

The resulting red pixel patterns for a color filter were evaluated according to items of the performance test. As a result, these pixel patterns were found to have superior heat resistance and superior solvent resistance. The absorption spectra and thin-film X-ray diffractions of the red pixel patterns after the heat resistance test were measured. No changes in crystal form or increases in the crystal size of the red pigment were observed. The evaluation results are summarized in Table 1.

Example 5

A photopolymerizable colored composition (R-5) was obtained in the same manner as in Example 1, except that the photopolymerizable resin DPHA used in Example 1 was replaced by pentaerythritol triacrylate (hereinafter abbreviated as PETA). In the same manner as in Example 1, the storage stability and various physical properties of the coating layer were evaluated. The evaluation results are shown in Table 1.

25 g of the resulting photopolymerizable colored composition (R-5) was transferred to a glass container and stored at 40° C. for 24 hours after sealing, and the storage stability was evaluated. As a result, the storage stability was found to be good.

Then, pixel patterns were formed on a glass substrate using the photopolymerizable colored composition (R-5) in the same manner as in Example 1. In the same manner as in Example 1, the resulting coating patterns were exposed and thermosetted to obtain a red pixel patterns for a color filter.

The resulting red pixel patterns for a color filter were evaluated according to items of the performance test. As a result, these pixel patterns were found to have superior heat resistance and superior solvent resistance. The absorption spectra and thin-film X-ray diffractions of the red pixel patterns after the heat resistance test were measured. No changes in crystal form or the increases in the crystal size of the red pigment were observed. The evaluation results are summarized in Table 1.

Example 6

A photopolymerizable colored composition (R-6) was obtained in the same manner as in Example 1, except that the photopolymerizable resin DPHA used in Example 1 was replaced by poly(tetramethylene glycol) bis(maleimide acetate) [average molecular weight of poly(tetramethylene glycol): 250] (hereinafter abbreviated to MIA250).

25 g of the resulting photopolymerizable colored composition (R-6) was transferred to a glass container and stored at 40° C. for 24 hours after sealing, and the storage stability was evaluated. As a result, the storage stability was found to be good.

Then, pixel patterns were formed on a glass substrate using the photopolymerizable colored composition (R-6) in the same manner as in Example 1. In the same manner as in Example 1, the resulting coating patterns were exposed and thermosetted to obtain red pixel patterns for a color filter.

The resulting red pixel patterns for a color filter were evaluated according to items of the performance test. As a result, these pixel patterns were found to have superior heat resistance and superior solvent resistance. The absorption spectra and thin-film X-ray diffractions of the red pixel patterns after the heat resistance test were measured. No changes in crystal form and increases in the crystal size of the red pigment were observed.

The evaluation results are summarized in Table 1.

Comparative Example 1

A photopolymerizable colored composition (R-7) for comparison was obtained in the same manner as in Example 1, except that the amino resin (A-1) used in Example 1 was replaced by an acrylic resin (A-4) obtained in Preparation Example 4.

In the same manner as in Example 1, the storage stability of the colored composition (R-7) and various physical properties of the coating patterns were evaluated. The evaluation results are shown in Table 1.

25 g of the resulting photopolymerizable colored composition (R-7) was transferred to a glass container and stored at 40° C. for 24 hours after sealing, and the storage stability was evaluated. As a result, the storage stability was found to be good.

Then, pixel patterns were formed on a glass substrate using the photopolymerizable colored composition (R-7) in the same manner as in Example 1. In the same manner as in Example 1, the resulting coating patterns were exposed and thermosetted to obtain red pixel patterns for a color filter.

The resulting red pixel patterns for a color filter were evaluated according to items of the performance test. As a result, these pixel patterns were found to have poor heat resistance and poor solvent resistance.

The absorption spectra and thin-film X-ray diffractions of the red pixel patterns after the heat resistance test were measured. An increase in the crystal size of the red pigment was observed.

It is apparent that, when using only an acrylic resin as the binder resin, the pixel patterns of the resulting red pixel patterns for a color filter of Comparative Example 1 are inferior in heat resistance and solvent resistance to those of Examples 1 to 6.

TABLE 1

|  |  | Example 1 | Example 2 | Example 3 | Example 4 | Example 5 | Example 6 | Comp. Example 1 |
|---|---|---|---|---|---|---|---|---|
| Composition of photopolymerizable colored composition | Amino resin solution | A-1<br>25.0 | A-2<br>25.0 | A-3<br>25.0 | A-1<br>12.5 | A-1<br>25.0 | A-1<br>25.0 | R-7 |
|  | Acrylic resin solution | — | — | — | A-4<br>12.5 | — | — | A-4<br>25.0 |
|  | Red pigment dispersion | 100 | 100 | 100 | 100 | 100 | 100 | 100 |
|  | Photopolymerizable monomer | DPHA<br>7.0 | DPHA<br>7.0 | DPHA<br>7.0 | DPHA<br>7.0 | PETA<br>7.0 | MIA250<br>7.0 | DPHA<br>7.0 |
|  | Irg-#369 | 0.3 | 0.3 | 0.3 | 0.3 | 0.3 | 0.3 | 0.3 |
| Performance of Coating patterns | Storage stability | ○ | ○ | ○ | ○ | ○ | ○ | ○ |
|  | Heat resistance 1 | ○ | ○ | ○ | ○ | ○ | ○ | X |
|  | Heat resistance 2 | ○ | ○ | ○ | ○ | ○ | ○ | X |
|  | Appearance of coating patterns after heat resistance test | good | good | good | good | good | good | slightly uneven surface |
|  | Solvent resistance 1 | ○ | ○ | ○ | ○ | ○ | ○ | ○ |
|  | Solvent resistance 2 | ○ | ○ | ○ | ○ | ○ | ○ | X |

All numbers in the table indicate parts by weight.
DPHA: dipentaerythritol hexaacrylate
PETA: pentaerythritol triacrylate
MIA250: poly(tetramethylene glycol) bis(maleimide acetate) [average molecule weight of poly(tetramethylene glycol): 250]
Irg #369: IRGACURE #369

Example 7

Using a high-speed dispersing machine "TSG-6H" (manufactured by Igarashi Kikai Seizo) charged with 0.5 mmø zirconia beads, a dispersion consisting of 25.0 parts of an amino resin solution (A-1) having a carboxyl group prepared in Preparation Example 1, 8.0 parts of Pigment Blue 15:6, and 2.5 parts of "DISPERBYK 163" as a dispersant, and 64.5 parts of PGMAc was dispersed at 2000 m$^{-1}$ for eight hours and the mixture was filtered through a filter having a pore diameter of 1.0 μm to obtain a thermosetting colored composition (B-1).

25 g of the resulting thermosetting colored composition (B-1) was transferred to a glass container and stored at 40° C. for 24 hours after sealing. The storage stability was evaluated. As a result, the storage stability was found to be good.

The thermosetting colored composition (B-1) was coated on a glass substrate by a piezo ink-jet print head, and then pre-baked at 110° C. for 10 minutes to form blue coating patterns. The resulting coating patterns were cured in an oven at 200° C. in accordance with the thermosetting conditions for 30 minutes. The resulting coating layer patterns were after-baked at 230° C. for 15 minutes.

The resulting blue pixel patterns for a color filter were evaluated according to items of the performance test.

As a result, the heat resistance 1 was found to be good (○) and the heat resistance 2 was found to be good (○). The appearance of the coating patterns after the heat resistance test was found to be good. Also the solvent resistance 1 was found to be good (○) and the solvent resistance 2 was found to be good (○). These pixel patterns were found to have superior heat resistance as well as superior solvent resistance. The absorption spectra and thin-film X-ray diffractions of the blue pixel patterns after the heat resistance test were measured. No changes in crystal form or increases in the crystal size of the blue pigment were observed.

Comparative Example 2

A thermosetting colored composition (B-2) for comparison was obtained in the same manner as in Example 7, except that the 25.0 parts of the amino resin solution (A-1) was replaced by 25.0 parts by weight of a malamine resin [SUPER BECKAMINE J-820-60 (n-butanol/xylene solution), manufactured by DAINIPPON INK & CHEMICALS, Inc.].

In Comparative Example 2, the dispersibility of the blue pigment was poor and the ejecting properties were poor when ejected onto the glass substrate using a piezo ink-jet print head, thus causing clogging of the head. Therefore, evaluations according to items of the performance test were not carried out.

As is apparent from the above results, the thermosetting colored composition of Comparative Example 2 is inferior in performance to the thermosetting colored composition using the amino resin solution having a carboxyl group of Example 7.

Example 8

A 2-butanone solution (A-1-1) of the amino resin having 40.0% of a nonvolatile content (% by weight of a residual resin after drying at 107.5° C. for one hour) was obtained in the same manner as in Preparation Example 1, except that 2-butanone was added in place of the propylene glycol monomethyl ether acetate after the water and n-butanol were distilled off. The 2-butanone solution (A-1-1) of the amino resin was neutralized by adding aqueous ammonia solution and then 2-butanone was distilled off under a reduced pressure. The nonvolatile content was adjusted to 30.0% by adding deionized water to obtain an aqueous neutralized amino resin solution (A-1-2). Using a "TSG-6H" high-speed dispersing machine (manufactured by Igarashi Kikai Seizo) charged with 0.5 mmø zirconia beads, a dispersion consisting of 33.0 parts of the neutralized amino resin solution (A-1-2), 8.0 parts of Pigment Blue 15:6, 2.5 parts of "DISPERBYK 163" as a dispersant, 20.0 parts of diethylene glycol, and 40.0 parts of deionized water were dispersed at 2000 m$^{-1}$ for eight hours and then the mixture was filtered through a filter having a pore diameter of 1.0 μm to obtain a thermosetting colored composition (B-3).

25 g of the resulting thermosetting colored composition (B-3) was transferred to a glass container and stored at 40° C. for 24 hours after sealing. The storage stability was evaluated. As a result, the storage stability was found to be good.

Pixel patterns were formed on a glass substrate, on which a hydrophobic black matrix and a hydrophilic ink-jet ink receiving layer are formed, using the thermosetting colored composition (B-3) by a piezo ink-jet print head, and then pre-baked at 110° C. for 10 minutes to form a blue patterns. The resulting patterns were cured in an oven at 200° C. for 30 minutes. The resulting coating patterns were after-baked at 230° C. for 15 minutes and then the heat resistance test 1, the heat resistance 2, the solvent resistance test 1, and the solvent resistance test 2 were carried out.

The result of the heat resistance 1 was good (○), that of the heat resistance 2 was good (○), and the appearance of the coating patterns after the heat resistance test was good. Also the solvent resistance 1 was good (○) and the solvent resistance 2 was good (○). The resulting blue patterns for a color filter had superior heat resistance as well as superior solvent resistance. The absorption spectra and thin-film X-ray diffractions of the blue pixel patterns after the heat resistance test were measured. No changes in crystal form or increases in the crystal size of the blue pigment were observed.

Comparative Example 3

A thermosetting colored composition (B-4) for comparison was obtained in the same manner as in Example 8, except that 33.0 parts of an aqueous neutralized acrylic resin solution having a nonvolatile content of 30.0%, obtained by neutralizing the acrylic resin (A-4) prepared in Preparation Example 4 in the same manner as in Example 8, was used in placed of 33.0 parts of the aqueous neutralized amino resin solution (A-1-2).

In the same manner as in Example 8, except that a thermosetting colored composition (B-4) was used in place of the thermosetting colored composition (B-3), cured pixel patterns were formed on a glass substrate, on which a hydrophobic black matrix and a hydrophilic ink-jet ink receiving layer were formed, and then the heat resistance test 1, the heat resistance 2, the solvent resistance test 1, and the solvent resistance test 2 were carried out.

The heat resistance 1 and the heat resistance 2 were poor (×) and the appearance of the coating after the heat resistance test showed a slightly uneven surface. Further, the solvent resistance 1 was good (○) and the solvent resistance 2 was poor (×). The resulting blue patterns for a color filter had poor heat resistance and poor solvent resistance. The absorption spectra and thin-film X-ray diffractions of the blue pixel patterns after the heat resistance test were measured. A change in crystal form and an increase in the crystal size of the blue pigment were observed.

As is apparent from the above results, the blue pixel patterns for a color filter of Comparative Example 3 using only the acrylic resin as the binder resin are inferior in heat resistance and solvent resistance to the blue pixel patterns for a color filter obtained in Example 8.

What is claimed is:

1. A method of producing a color filter, comprising: forming pixels on a transparent substrate using a colored composition containing (a) an amino resin having a carboxyl group and/or a phenolic hydroxyl group, (b) a pigment, (c) an organic solvent, and (d) a compound having a photopolymerizable functional group, which is a polyfunctional (meth)acrylate and/or a polyfunctional maleimide, by an ink-jet printing method; photocuring the pixels; and then heat-curing the photocured pixels.

2. The method of producing a color filter according to claim 1, wherein the amino resin (a) having a carboxyl group and/or a phenolic hydroxyl group is an amino resin obtained by condensing (a-1) (4,6-diamino-1,3,5-triazin-2-yl)benzoic acid with (a-2) at least one aldehyde compound selected from the group consisting of formaldehyde, glyoxylic acid, succinsemialdehyde, and hydroxybenzaldehyde.

3. The method of producing a color filter according to claim 1, wherein the amino resin (a) having a carboxyl group and/or a phenolic hydroxyl group is an amino resin obtained by condensing (a-3) at least one triazine compound selected from the group consisting of melamine, benzoguanamine, and (4,6-diamino-1,3,5-triazin-2-yl)benzoic acid with (a-4) at least one aldehyde compound selected from the group consisting of glyoxylic acid, succinsemialdehyde, and hydroxybenzaldehyde.

4. The method of producing a color filter according to claim 1, wherein the transparent substrate has an ink-jet ink receiving layer thereon.

5. A method of producing a color filter according to claim 1, wherein (d) the compound having a photopolymerizable, functional group is at least one selected from the group consisting of polyfunctional (meth)acrylates including trimethylolpropane tri(meth)acrylate, pentaerythritol tetra (meth)acrylate, dipentaerythritol hexa(meth)acrylate, and dipentaerythritol penta(meth)acrylate; and polyfunctional maleimides including N,N'-4,9-dioxa-1,12-bismaleimidedecane, ethylene glycol bis(maleimide acetate), poly(tetramethylene glycol) bis(maleimide acetate), (ethylene glycol modified) pentaerythritol tetra (maleimide acetate), bis(2-maleimideethyl) carbonate, and isophoronebisurethanebis(N-ethylmaleimide).

6. The method of producing a color filter according to claim 1, wherein an energy ray used for photocuring is in the wavelength range of 200 to 500 nm.

7. The method of producing a color filter according to claim 1, wherein heating temperature for heat-curing is within a range from 150 to 300° C.

8. The method of producing a color filter according to claim 1, wherein the amount of the compounds having a photopolymerizable functional group is from 25 to 150% by weight based on the total amount of the binder resins containing an amino resin (a) of the photopolymerizable colored composition.

9. The method of producing a color filter according to claim 1, wherein the amount of (b) the pigment in the colored composition is within a range of 10 to 70% by weight based on the non-volatile content in the colored composition.

10. The method of producing a color filter according to claim 1, wherein the average particle diameter of (b) the pigment is within a range of 0.005 to 3 m.

11. The method of producing a color filter according to claim 1, wherein the average particle diameter of (b) the pigment is within a range of 0.01 to 1 μm.

12. The method of producing a color filter according to claim 1, wherein the amount of (c) the solvent is within a range of 1 to 19 parts by weight based on 1 part by weight of the non-volatile content in the colored composition.

13. The method of producing a color filter according to claim 1, wherein (c) the solvent has a boiling point of 80 to 200° C.

14. The method of producing a color filter according to claim 1, wherein (c) the solvent is at least one selected from the group consisting of aromatic solvents including toluene, xylene, and methoxybenzene; acetic acid ester solvents including ethyl acetate, butyl acetate, propylene glycol monomethyl ether acetate, and propylene glycol monoethyl ether acetate; propionate solvents including ethoxyethyl propionate; alcohol solvents including methanol, ethanol, propanol, and ethyleneglycol; ether solvents including butylcellosolve, propylene glycol monomethyl ether, diethylene glycol diethyl ether, and diethylene glycol dimethyl ether; ketone solvents including methyl ethyl ketone, methyl isobutyl ketone, and cyclohexanone; aliphatic hydrocarbon solvents including hexane; nitrogen compound solvents including N,N-dimethylformamide, γ-butyrolactam, N-methyl-2-pyrrolidone, aniline, and pyridine; lactone solvents including γ-butyrolactone; and carbamic acid esters.

15. The method of producing a color filter according to claim 1, wherein (c) the solvent is at least one selected from the group consisting of acetic acid ester solvents which include ethyl acetate, butyl acetate, propylene glycol monomethyl ether acetate, and propylene glycol monoethyl ether acetate.

16. The method of producing a color filter according to claim 1, wherein the viscosity of the colored composition is not more than 50 mPa·s.

17. The method of producing a color filter according to claim 1, wherein the viscosity of the colored composition is not more than 10 mPa·s.

* * * * *